Figure 1B:
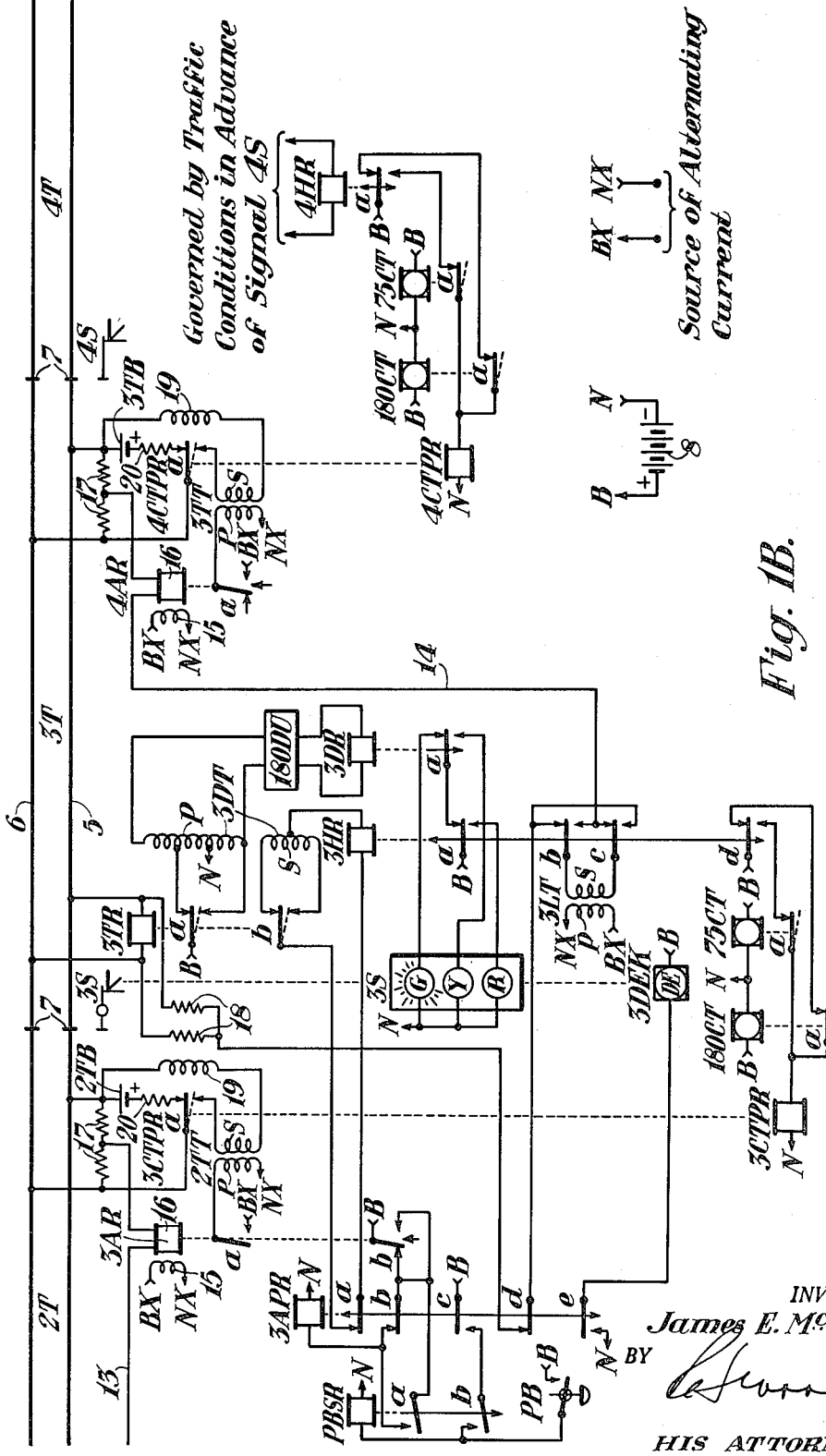

May 22, 1956  J. E. McMAHON, JR  2,747,081
DRAGGING EQUIPMENT DETECTOR SYSTEM
Filed Oct. 31, 1950  2 Sheets-Sheet 1
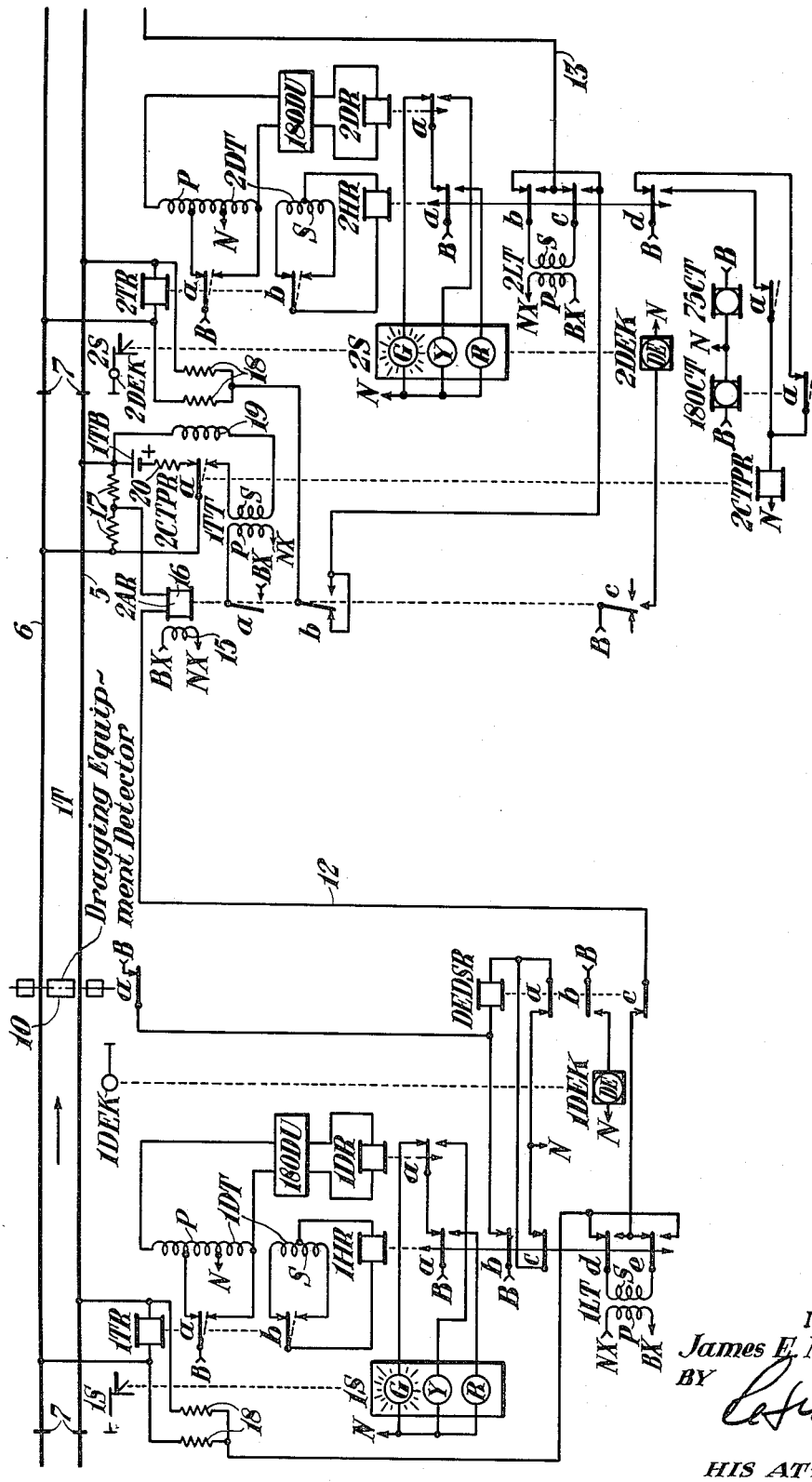
Fig. 1A.
INVENTOR.
James E. McMahon Jr.
BY
HIS ATTORNEY May 22, 1956     J. E. McMAHON, JR     2,747,081

DRAGGING EQUIPMENT DETECTOR SYSTEM

Filed Oct. 31, 1950     2 Sheets-Sheet 2

INVENTOR.
James E. M<sup>c</sup>Mahon Jr.
BY
HIS ATTORNEY

United States Patent Office 2,747,081
Patented May 22, 1956

2,747,081

DRAGGING EQUIPMENT DETECTOR SYSTEM

James E. McMahon, Jr., Penn Township, Allegheny County, Pa., assignor to Westinghouse Air Brake Company, a corporation of Pennsylvania Application October 31, 1950, Serial No. 193,063

3 Claims. (Cl. 246—219)

My invention relates to dragging equipment detector systems for railroads, and more particularly to circuits for use in connection with self restoring type dragging equipment detectors which detect the presence of objects dragging or hanging from passing vehicles.

A dragging equipment detector is used principally in the rear of locations such as switches, crossovers, tunnels, bridges, interlocking plants and the like where damage and derailment may occur due to the presence of objects dragging or hanging from passing vehicles. Suitable signal indication means are also provided in the rear of such locations, and these indication means are controlled by the detectors in a manner to provide an indication when the dragging equipment detector has been actuated. Thus, when the engineman on a passing train observes an aspect which indicates that the dragging equipment detector has been actuated, the train can be brought to a stop, repairs can be made or other appropriate action taken, and the train can then proceed without danger of damage or derailment resulting from the dragging equipment.

Many of the previous dragging equipment detector systems employed frangible detector bars which were arranged to be broken by hanging or dragging equipment on passing vehicles. The detector bars were a part of a series electrical circuit which governed various signal indication means. Thus when the detector bars were broken the series circuit was opened thereby causing the signal indication means to display aspects indicating that the dragging equipment detector had been actuated. After the frangible detector bars were broken it was necessary to replace them in order to restore the various signal indication means to their normal positions. This replacement was costly because it required that a signal maintainer be called out to replace the broken bars with new ones.

The present invention is particularly suitable for, although in no way limited to, use in connection with a dragging equipment detector of the type shown and described in United States Patent No. 2,662,973 to K. J. J. McGowan and R. A. Woods for Self Restoring Dragging Equipment Detectors. This detector comprises upstanding detector plates supported on a shaft between the rails, and arranged so as to be deflected when struck by an object that is hanging or dragging from passing vehicles. The detector plates are biased to their normal upright position, and accordingly when they are deflected, they return to their upright position as soon as the dragging object clears the detector. The shaft which supports the plates is operatively connected with a contact which is arranged to be normally closed when the detector plates are in their upright position, and to be opened when the detector plates are deflected. Therefore, when such a detector is used it becomes necessary to provide signal control circuits which are governed by the momentary opening of the contact associated with the dragging equipment detector and which circuits will function to cause the signal means to display aspects indicating that the dragging equipment detector has been actuated after the dragging object has cleared the detector.

Accordingly, it is an object of my invention to provide improved circuits to be used with a self restoring type of dragging equipment detector which will function to cause various signal means to display aspects indicating that the dragging equipment detector has been actuated by an object dragging or hanging from a train, but which will not function in response to malicious or inadvertent actuation of the detector by trespassers or unauthorized persons.

It is a further object of my invention to provide circuits to be used with self restoring dragging equipment detectors to cause various signal means to display aspects indicating that the dragging equipment detector has been actuated by an object dragging or hanging from a train, the control of the signal means being such that they will display their normal aspects as soon as the train has progressed more than a predetermined distance beyond the dragging equipment detector.

Another object of my invention is to provide circuits to be used with self restoring dragging equipment detectors to cause various signal means to display aspects indicating that the dragging equipment detector has been actuated, which circuits may be completed over a conducting path which is used for other circuits, such as approach control circuits.

According to my invention a self restoring type dragging equipment detector is located adjacent a stretch of track in the rear of a wayside signal. The contact of this detector controls a stick circuit for a stick relay having a pick up circuit which is completed whenever the track section in which the detector is located is unoccupied. Thus, in the absence of vehicles in the stretch of track proximate the location of the dragging equipment detector, the relay remains energized even though the dragging equipment detector might be inadvertently actuated to open its contact. If vehicles are occupying the stretch of track proximate the location of the dragging equipment detector, the pick up circuit will be open so that if the dragging equipment detector is actuated to open the stick circuit, the relay will become deenergized.

A shunt circuit is also provided across the means governed by the stick relay in its picked up position, which includes means governed by the absence of vehicles in the stretch of track proximate the location of the dragging equipment detector. Thus, if vehicles are occupying the stretch of track proximate the location of the dragging equipment detector, and the dragging equipment detector is acuated to open its contact, the stick relay will be deenergized as previously described. When the dragging equipment detector closes its contact after having been actuated, the stick relay remains deenergized because both the circuit including means governed by the stick relay in its picked up position and the shunt circuit including means governed by the absence of vehicles in the stretch of track, are open. However, when the vehicle vacates the stretch of track, the shunt circuit including means governed by the absence of vehicles in the stretch of track, connected across the means governed by the stick relay in its picked up position, closes and thereby completes the circuit for energizing the relay. Circuits controlling the aspect displayed by various wayside signals as well as various signal indication means, which are intended to display aspects indicating that the dragging equipment detector has been actuated, are governed by means of the stick relay in its deenergized position. Furthermore, these circuits may be carried over existing line wires so that it is not necessary to provide additional line wires.

Other objects and characteristic features of my invention will become apparent as the description proceeds.

I shall describe one form of railway signaling system embodying my invention and shall then point out the novel features thereof in claims.

In the accompanying drawings, Figs. 1a and 1b placed side by side with Fig. 1a at the left and Fig. 1b at the right comprise a diagrammatic view illustrating the track plan and wayside circuits and apparatus for one form of railway signaling system embodying my invention.

Referring to the drawings the reference characters 5 and 6 designate the track rails of a stretch of railway track over which traffic normally moves in the direction indicated by the arrow, that is, from left to right. The track rails are divided, by means of insulated joints 7, to form track sections 1T, 2T, 3T and 4T.

Each track section is provided with a coded track circuit including a code following track relay, such as 2TR, connected across the rails at the entrance end of the section, and a track battery, such as battery 2TB, located at the exit end of the section. The supply of energy from the track battery to the code following track relay over the rails of the section is governed by a code transmitting relay, such as relay 3CTPR, the contacts of which are operated at various code rates, such as, for example, 75 or 180 times per minute. The recurrent operation of the contacts of the code following track relay is decoded to control a wayside signal associateed therewith in a manner to be subsequently explained.

Each wayside signal is located adjacent the entrance end of the associated track section and is designated by the reference character S with a prefix corresponding to the signal location. The signals may be of any suitable type and each signal as here shown is of the type commonly known as a color-light signal having a green lamp G, a yellow lamp Y, and a red lamp R, which lamps when lit indicate "clear," "approach, prepare to stop at next signal" and "stop," respectively.

Associated with the signals are a plurality of relays which will be described in detail hereinafter. Each of these relays is identified by a characteristic letter or combination of letters, having the same prefix as the prefix for the reference character of the signal with which it is associated. For example, the relays associated with signal 2S are designated 2HR, 2DR, etc.

Energy for the operation of the apparatus other than the track circuits is furnished by suitable sources of direct current and alternating current. The source of direct current is here shown as a battery 8, the positive and negative terminals of which are designated by the reference characters B and N, respectively. The source of alternating current, not shown, is provided with terminals designated by the reference characters BX and NX.

The equipment is shown in its normal condition which it assumes when the stretch of railway track is vacant. At this time energy of 180 code frequency is supplied to the rails of the various track sections from the track batteries by the recurrent operation of the contacts of the code transmitting relays, and the green lamps of signals 1S, 2S, 3S and 4S are lit thereby providing "clear" indications.

In the coded track circuit system as shown herein, the coded currents are generated by code transmitters designated 180CT and 75CT at the various locations. These code transmitters are energized continuously and operate their contacts periodically at a rate of 180 or 75 times per minute, respectively, to periodically operate a code transmitting relay such as relay 2CTPR, by which coded energy of the selected frequency is supplied to the track rails. This coded energy controls code responsive apparatus at the different signal locations. The apparatus associated with the different track sections is substantially similar and its operation will be understood from the description of the apparatus associated with the track section 2T. Referring to track section 2T, it will be seen that energy is supplied by the track battery 2TB over the rails of track section 2T to the winding of the code following track relay 2TR. As will be pointed out hereinafter this energy is coded at 180 or 75 times per minute depending upon traffic conditions in advance, and it follows, therefore, that relay 2TR will at times operate its contacts at 180 times per minute and at other times, at 75 times per minute. The periodically operating contacts of the code following relays are distinguished from those of the conventional quick acting type relays by dotted lines indicating the alternative position of the contacts.

When relay 2TR is periodically operating its contacts, contact a alternately completes energizing circuits for the lower half and the upper half of the primary winding P of a decoding transformer 2DT. As a result, current is induced in the secondary winding S of transformer 2DT, which current is mechanically rectified by contact b of relay 2TR and supplied to the winding of a slow acting code detecting relay 2HR which is slow in both picking up and releasing its contacts. The contacts of the slow acting relays are distinguished from those of the conventional quick acting type relays by the vertical arrows thereon. The direction of the arrow heads indicates the direction in which the relay is slow in operating its contacts, that is, a downwardly pointing arrow head indicates that the relay is slow in releasing its contacts, and a double headed arrow indicates that the relay is slow in both releasing and picking up its contacts. It will be seen therefore that the relay 2HR will be energized to close its front contacts and open its back contacts whenever the track relay 2TR is following code. Also, the primary winding P of transformer 2DT is connected to an autotransformer winding that supplies code frequency energy to a decoding unit 180DU which is of a type well known in the art. The decoding unit 180DU is constructed and arranged so that it will supply energy of a value sufficient to pick up the contacts of a slow release "clear" control relay 2DR when and only when the frequency of the energy supplied to the decoding unit from transformer 2DT is of the order of 180 cycles per minute. Accordingly, relay 2DR will be energized when and only when the code following track relay 2TR is responding to 180 code.

The circuits governing the aspect displayed by signal 2S are controlled by the code detecting relay 2HR and the "clear" control relay 2DR. When the track relay 2TR is responding to 180 code, the contacts of both relay 2HR and relay 2DR will be picked up as previously described, thereby establishing a circuit which may be traced from terminal B, through front contact a of relay 2HR, front contact a of relay 2DR, and the green lamp G of signal 2S to terminal N, so that signal 2S will then display a green aspect indicating "clear." When, however, the track relay 2TR is responding to the 75 code, the contacts of relay 2HR will be picked up and the contacts of relay 2DR will be released. Under these conditions a circuit will be established which may be traced from terminal B, through front contact a of relay 2HR, back contact a of relay 2DR, and the yellow lamp Y of signal 2S to terminal N, and signal 2S will therefore display a yellow aspect indicating "approach." It will also be seen that when the track relay is not responding to a code rate, that is, receiving no energy or insufficient energy to operate its contacts, the contacts of both relay 2HR and relay 2DR will be released, and under these conditions a circuit will be completed which may be traced from terminal B, through back contact a of relay 2HR, and the red lamp R of signal 2S to terminal N so that signal 2S displays a red aspect indicating "stop."

The circuits governing the frequency of the coded energy supplied to the track rails of track section 2T are controlled by the code detecting relay 3HR which is similar in its operation and functions to relay 2HR described above. When signal 3S displays a green aspect indicating "clear," as shown in Fig. 1B, the contacts of relay 3HR are picked up thereby establishing a circuit which may be traced from terminal B, over front contact $d$ of relay 3HR, contact $a$ of code transmitter 180CT, and through the winding of the code transmitting relay 3CTPR to terminal N so that the contacts of relay 3CTPR are recurrently operated at a rate of 180 times per minute. When signal 3S displays a yellow aspect indicating "approach" the contacts of relay 3HR will still be picked up so that the contacts of relay 3CTPR will continue to be operated at a rate of 180 times per minute. When signal 3S displays a red aspect indicating "stop," a circuit will then be completed which may be traced from terminal B, over back contact $d$ of relay 3HR, contact $a$ of code transmitter 75CT, and the winding of the code transmitting relay 3CTPR to terminal N. Under these conditions the contacts of relay 3CTPR will be recurrently operated at a rate of 75 times per minute.

The system also includes approach controlled means for governing train carried cab signals or train control apparatus. These means comprise a source of alternating current which becomes connected to the rails of each track section when a train enters the section, and which is periodically interrupted or coded at the same rate as the direct current energy which controls the wayside signals. The coded alternating current flowing in the track rails cooperates with a receiver mounted on the train in inductive relation to the rails, to induce in the receiver an electromotive force of the frequency and code rate of the rail current. The received electromotive force is used to operate a train carried code following relay which in turn governs train carried controlling devices or train carried indication means through decoding apparatus that is selectively responsive to the code rate at which the relay is operated. Normally the train carried indication means provide the same indication on the train that is displayed by the wayside signals. It should be noted that when no coded alternating current energy is being received by the receiver, the train carried controlling devices or indication means operate to their most restrictive condition. Such train carried signal systems are well known in the art, and a detailed description is therefore believed to be unnecessary. One form of cab signal system which will operate in the manner just described is described in Letters Patent of the United States No. 1,986,679, issued January 1, 1935, to L. V. Lewis.

The supply of the alternating current train control energy to the track rails of track section 2T is governed by an approach relay 3AR. This relay, as here shown, is a three position alternating current relay having a local winding 15, a line winding 16, and movable contact arms $a$ and $b$. Relays 2AR and 4AR are similar, except that relay 2AR has an additional contact $c$ while relay 4AR is provided with a single contact $a$, for purposes to be described. These relays may, for example, be of the type shown in United States Patent No. 1,416,953. The local winding 15 is continuously supplied with alternating current energy from the terminals BX and NX, while the line winding is at times deenergized, and at other times energized by alternating current in phase with the energy applied to winding 15 or 180° out of phase therewith. When the line winding 16 is deenergized the contacts $a$ and $b$ move to their vertical position. When, however, the line winding is energized, the contacts $a$ and $b$ then move to their left hand or right hand position according as the line winding is supplied with current of the one relative polarity or the other with respect to the instantaneous polarity of the current applied to the local winding 15.

The line winding 16 of relay 3AR is supplied with alternating current energy of the one relative polarity, that is, in phase with current applied to the local winding, over a single line wire and rail return loop circuit that may be traced from the lower end of the secondary winding S of transformer 2LT, over front contact $c$ of relay 2HR, line wire 13, the line winding 16 of relay 3AR, dividing resistors 17 to the rails 5 and 6 in parallel at the exit end of track section 2T, the rails 5 and 6 of track section 2T, dividing resistors 18 at the entrance end of track section 2T, contact $b$ of relay 2AR in its left hand position, and front contact $b$ of relay 2HR to the upper end of the secondary winding S of transformer 2LT. When contacts $b$ and $c$ of relay 2HR are released, the line winding 16 of relay 3AR will then be supplied with alternating current energy of the other relative polarity, that is, 180° out of phase with current applied to winding 15, over a circuit which is identical with that just traced except that this circuit includes back contacts $b$ and $c$ of relay 2HR rather than front contacts $b$ and $c$ of this relay. It will be apparent therefore that the contacts of relay 3AR will occupy their left hand or right hand positions according as the contacts of relay 2HR are picked up or released.

It will also be seen that when contact $b$ of relay 2AR is in its vertical position, thereby opening the loop circuit traced above, the line winding 16 of relay 3AR will be deenergized and the contact arms $a$ and $b$ of relay 3AR will then operate to their vertical positions.

When contact arm $a$ of relay 3AR is in its right hand position, an obvious circuit is established for supplying alternating current energy to the primary winding P of track transformer 2TT. The secondary winding S of track transformer 2TT supplies suitable coded alternating current train control energy to the track rails over a circuit which may be traced from the upper terminal of secondary winding S of transformer 2TT, through back contact $a$ of the code transmitting relay 3CTPR to rail 6 at the exit end of track section 2T, and from the lower terminal of the secondary winding S of transformer 2TT, through the current limiting impedance 19 to rail 5 at the exit end of track section 2T. The rate at which this current is coded will depend of course upon the rate at which the contact $a$ of relay 3CTPR is recurrently operated which it will be remembered is 180 or 75 times per minute depending upon traffic conditions in advance. Suitable coded direct current energy for the operation of the track relay 2TR is supplied to the track rails by a circuit which may be traced from the positive terminal of the track battery 2TB, through the current limiting resistor 20, front contact $a$ of the code transmitting relay 3CTPR to rail 6 at the exit end of track section 2T, and from the negative terminal of the track battery 2TB to rail 5 at the exit end of track section 2T. Thus, with contact $a$ of relay 3CTPR recurrently operating at a code rate of either 75 or 180 times per minute, coded direct current energy is supplied to the track rails over front contact $a$ of relay 3CTPR, and when contact $a$ of relay 3AR is in its right-hand position, coded alternating current energy is supplied to the track rails over back contact $a$ of relay 3CTPR.

From the foregoing description of the operation of signal 2S and the apparatus and circuits associated with track section 2T, the operation of the similar parts associated with track sections 1T and 3T will be readily understood. The slight differences between the circuits associated with the various track sections will be described in detail hereinafter.

A self restoring type dragging equipment detector, designated by the reference character 10 and having a normally closed contact $a$ is here shown located adjacent track rails 5 and 6 in track section 1T. The dragging equipment detector 10 may, for example, be of the type shown and described in the McGowan and Woods Patent No. 2,662,973, referred to hereinbefore.

A dragging equipment detector stick relay designated DEDSR is normally energized by a stick circuit which may be traced from positive terminal B, through contact $a$ of the dragging equipment detector 10, the winding of relay DEDSR, and front contact $a$ of relay DEDSR to negative terminal N. Relay DEDSR is also at times energized by a multiple circuit which may be traced from the positive terminal B, through front contact *b* of relay 1HR, the winding of relay DEDSR, and front contact *c* of relay 1HR to the negative terminal N. Thus, it will be seen that if contact *a* of the dragging equipment detector 10 is opened when the contacts of relay 1HR are picked up, the dragging equipment detector stick relay DEDSR will remain picked up and will not release its contacts, but that if contact *a* of the dragging equipment detector 10 is opened when the contacts of relay 1HR are released, the dragging equipment detector stick relay DEDSR will release its contacts.

In order to explain the operation of the apparatus as a whole, it will first be assumed that track sections 1T, 2T, 3T and 4T are all unoccupied, as shown, and that a train moves through the stretch of track from left to right without actuating the dragging equipment detector 10.

When the train moves past signal 1S and enters track section 1T, the wheels and axles of the train will shunt the supply of energy from the rails 5 and 6 to the winding of the code following track relay 1TR, and the code following operation of relay 1TR will therefore cease. Accordingly, relays 1HR and 1DR will release their contacts and signal 1S will display a red aspect indicating "stop." Also, when relay 1HR releases its contacts *d* and *e*, the energy supplied to the line winding 16 of relay 2AR over the rail return loop circuit including line wire 12, and front contact *c* of relay DEDSR will cause the movable contact arms of relay 2AR to operate to their right-hand position. When contact arm *a* of relay 2AR moves to its right-hand position, coded alternating current train control energy will be supplied to the track rails at the exit end of track section 1T in a manner similar to that described hereinbefore.

When the train moves past signal 2S and enters track section 2T vacating track section 1T, track relay 2TR will cease its code following operation and accordingly relays 2HR and 2DR will release their contacts. This will cause signal 2S to display a red aspect indicating "stop," and code transmitting relay 2CTPR to operate its contacts at a code rate of 75 times per minute so that 75 code will be supplied to the winding of relay 1TR. Accordingly, the contacts of relay 1HR will be picked up and the contacts of relay 1DR will be released so that signal 1S will display a yellow aspect indicating "approach". The relative polarity of current applied to winding 16 will be reversed at contacts *d* and *e* of relay 1HR so that contact *a* of relay 2AR will move to its left-hand position and coded alternating current energy will no longer be supplied to the track rails of section 1T. Since the contacts of relay 2HR are released, the movable contact arms of relay 3AR will operate to their right-hand position and alternating current energy coded at the rate of 180 times per minute will be supplied to the track rails at the exit end of track section 2T.

When the train moves past signal 3S and enters track section 3T vacating track section 2T, track relay 3TR will cease its code following operation and accordingly relays 3HR and 3DR will release their contacts. This will cause signal 3S to display a red aspect indicating "stop," and code transmitting relay 3CTPR to operate its contacts at a code rate of 75 times per minute so that 75 code is supplied to the winding of relay 2TR. Accordingly, the contacts of relay 2HR will become picked up and the contacts of relay 2DR will remain released so that signal 2S will display a yellow aspect and the relative polarity of current applied to winding 16 with respect to current applied to winding 15 will be such as to cause contact *a* of relay 3AR to move to its left-hand position so that coded alternating current energy will no longer be supplied to the track rails of section 2T. Also, relay 2CTPR will now operate its contacts at a code rate of 180 times per minute so that the contacts of relay 1DR will become picked up and since the contacts of relay 1HR are already picked up signal 1S will display a green aspect indicating "proceed". With the contacts of relay 3HR released, the energy supplied to the line winding 16 of relay 4AR over line wire 14 and the rail return loop circuit will cause the movable contact arms of relay 4AR to operate to their right-hand position so that alternating current energy coded at the rate of 180 times per minute will be supplied to the track rails at the exit end of track section 3T.

By the symmetry of the circuits, it will now be seen that when the train moves past signal 4S and enters track section 4T vacating track section 3T, signal 4S will display a red aspect, signal 3S will display a yellow aspect, signal 2S will display a green aspect, signal 1S will display a green aspect, and coded alternating current energy will no longer be supplied to the track rails of section 3T.

It will now be assumed that a train which has entered section 1T has a dragging or hanging object which actuates the dragging equipment detector 10 as the train passes the detector. As was pointed out hereinbefore, when a train enters section 1T, the code following operation of relay 1TR will cease, relays 1HR and 1DR will release their contacts, signal 1S will display a red aspect indicating "stop," the movable contact arms of relay 2AR will operate to their right-hand position, and alternating current energy coded at the rate of 180 times per minute will be supplied to the track rails at the exit end of track section 1T. Now, the actuation of the detector 10 by the hanging object causes its contact *a* to be momentarily opened and since the contacts of relay 1HR are released, the winding of the dragging equipment detector stick relay DEDSR becomes deenergized and relay DEDSR releases its contacts. When relay DEDSR releases under these conditions it remains released even though contact *a* of the detector 10 recloses, because both front contacts *b* and *c* of relay 1HR and front contact *a* of relay DEDSR are open.

When the contacts of the dragging equipment detector stick relay DEDSR become released, an obvious circuit including back contact *b* of relay DEDSR is completed so that energy is supplied to the lamp of the dragging equipment indicator 1DEK. Thus, the dragging equipment indicator 1DEK is illuminated and thereby provides a warning indication to the train crew that the dragging equipment detector has been actuated. The indicator 1DEK is here shown located adjacent the trackway opposite the dragging equipment detector 10, and facing in such a manner that the train crew by looking back along the trackway can observe the indicator. This detector, however, may be located at any convenient location.

Also, when the contacts of the dragging equipment detector stick relay DEDSR become released, the supply of energy to the line winding 16 of relay 2AR over the rail return loop circuit including line wires 12 and contact *c* of relay DEDSR is cut off at contact *c* so that the movable contact arms of relay 2AR now operate to their vertical positions.

When the movable contact arm *a* of relay 2AR operates to its vertical position, the supply of coded alternating current energy to the track rails at the exit end of track section 1T is cut off, and as a result, the train carried control devices or indication means on the train occupying track section 1T operate to their most restrictive condition.

When the movable contact arm *c* of relay 2AR operates to its vertical position, an obvious circuit including contact arm *c* of relay 2AR is established so that energy is supplied to the lamp of a dragging equipment indicator 2DEK.

Indicator 2DEK is similar to indicator 1DEK and is here shown located on the same signal mast as signal 2S.

When the movable contact arm *b* of relay 2AR operates to its vertical position, the supply of energy to the line winding 16 of relay 3AR over the rail return loop circuit including line wire 13 and contact *b* of relay 2AR is cut off so that the movable contact arms of relay 3AR now operate to their vertical position.

When the movable contact arm *a* of relay 3AR operates to its vertical position, it prevents coded alternating current energy from being supplied to the track rails at the exit end of track section 2T.

When the movable contact arm *b* of relay 3AR operates to its vertical position, the winding of the approach repeater relay 3APR becomes deenergized. Relay 3APR is a slow pickup, slow release relay the winding of which is normally energized by a stick circuit which may be traced from terminal B, through contact arm *b* of relay 3AR in its left-hand position, front contact *b* of relay 3APR, and the winding of relay 3APR to terminal N. When contact arm *b* of relay 3AR operates from its left-hand position to its right-hand position the foregoing stick circuit for supplying energy to the winding of relay 3APR is momentarily interrupted, however, since relay 3APR is slow in releasing its contacts, relay 3APR does not release its contacts during this time. When contact arm *b* of relay 3AR is operated to its right-hand position, the stick circuit for supplying energy to the winding of relay 3APR is reestablished and the contacts of relay 3APR are maintained picked up.

It will now be seen that when contact arm *b* of relay 3AR is operated to its vertical position, the stick circuit for supplying energy to the winding of the slow acting approach repeater relay 3APR is interrupted and after a short time interval, such as one second, slow acting relay 3APR releases its contacts.

When relay 3APR releases its contacts, energy is supplied to the lamp of the dragging equipment indicator 3DEK over an obvious circuit including contact *e* of relay 3APR. Indicator 3DEK is similar to indicators 1DEK and 2DEK referred to above, and is here shown located on the same signal mast as signal 3S.

It will be apparent from an inspection of Fig. 1B that front contact *a* of relay 3APR is included in the circuit for supplying energy to the winding of relay 3HR. Therefore, when contact *a* of relay 3APR is released, the circuit for supplying energy to the winding of relay 3HR is interrupted, and relay 3HR releases its contacts even though the code followng track relay 3TR is responding to code. When relay 3HR releases its contacts, signal 3S displays a red aspect and code transmitting relay 3CTPR operates its contacts at a code rate of 75 times per minute so that 75 code is supplied to the winding of relay 2TR. Accordingly, the contacts of relay 2HR become picked up and the contacts of relay 2DR become released so that signal 2S displays a yellow aspect.

In view of the foregoing it is now apparent that when objects dragging or hanging from a vehicle actuate the self restoring dragging equipment detector 10, signal 3S is conditioned to display a red aspect, signal 2S is conditioned to display a yellow aspect, the dragging equipment indicators 1DEK, 2DEK and 3DEK are illuminated, and the train carried control devices or indication means on the train occupying track section 1T operate to their most restrictive condition. It will also be apparent that the preferable location for the dragging equipment detector 10 is in track section 1T in the rear of signal 2S such a distance that the end of a train will have passed over the detector when the front of the train is still some distance, say 2000 feet, in the rear of signal 2S. Accordingly, the complete train is able to pass over the dragging equipment detector and during the time thereafter that the train is approaching signal 2S, the engineman on the train has ample opportunity to observe the aspects displayed by signal 2S and the dragging equipment indicator 2DEK, as well as the condition of any train carried train control devices or indication means. Thus, when the dragging equipment detector is actuated, the engineman on the train, upon recognizing the various conditions so established, will bring the train to a stop so that repairs can be made to the defective vehicles having dragging or hanging objects. Furthermore, the engineman on the train, upon recognizing the various conditions established due to the actuation of the dragging equipment detector, will bring the train to a gradual halt in the rear of signal 3S, rather than making an emergency application of train brakes while the train is moving through track section 1T.

It should be noted that when the speed of the train is being reduced preparatory to stopping, the train crew riding at the rear of the train can look back along the trackway and upon observing that the dragging equipment indicator 1DEK is illuminated, will recognize the purpose for which the train speed is being reduced. It should be pointed out that the provision of the dragging equipment indicator 1DEK is not an essential part of my invention and that its inclusion is an optional feature of my invention.

When the train, in being brought to a gradual halt in the rear of signal 3S, moves past signal 2S and enters track section 2T vacating track section 1T, track relay 2TR ceases its code following operation and accordingly the contacts of relays 2HR and 2DR are released. This causes signal 2S to display a red aspect and code transmitting relay 2CTPR to operate its contacts at a code rate of 75 times per minute so that 75 code is supplied to the winding of relay 1TR. Accordingly, the contacts of relay 1HR are picked up and the contacts of relay 1DR remain released so that signal 1S displays a yellow aspect indicating "approach."

When relay 1HR picks up its contacts, the previously described circuit for energizing the winding of the dragging equipment detector stick relay DEDSR including contacts *b* and *c* of relay 1HR is established so that relay DEDSR picks up its contacts.

When the contacts of the dragging equipment detector stick relay DEDSR are picked up, the circuit including contact *b* of relay DEDSR for supplying energy to the lamp of the dragging equipment indicator 1DEK is interrupted so that the lamp of indicator 1DEK is no longer illuminated. Also, the rail return loop circuit including line wire 12 and contact *c* of relay DEDSR for supplying energy to the line winding 16 of relay 2AR is reestablished, and since contacts *d* and *e* of relay 1HR are picked up, relay 2AR will operate its movable contact arms to their left-hand position.

When the movable contact arm *c* of relay 2AR operates to its left-hand position, the circuit for supplying energy to the lamp of the dragging equipment indicator 2DEK is interrupted so that the lamp of indicator 2DEK is no longer illuminated.

When the movable contact arm *b* of relay 2AR operates to its left-hand position, the rail return loop circuit including line wire 13 and movable contact arm *b* of relay 2AR in its left-hand position for supplying energy to the line winding 16 of relay 3AR is reestablished, and since contacts *b* and *c* of relay 2HR are released, relay 3AR will operate its movable contact arms to their right-hand position.

When movable contact arm *a* of relay 3AR operates to its right-hand position, since code transmitting relay 3CTPR will then be operating its contacts at a code rate of 75 times per minute, alternating current energy coded at a rate of 75 times per minute will be supplied to the track rails at the exit end of track section 2T.

In view of the foregoing, it will be observed that when a train which has actuated the self restoring dragging equipment detector 10, moves past signal 2S and enters section 2T vacating track section 1T, signals 3S and 2S are conditioned to display a red aspect indicating "stop," signal 1S is conditioned to display a yellow aspect indicating "approach," dragging equipment indicators 1DEK and 2DEK are extinguished, indicator 3DEK is still illuminated, and the train carried control devices or indication means on the train occupying track section 2T operate in response to a 75 code rate.

When the train has been brought to a stop in the rear of signal 3S and appropriate action has been taken so that the train is now in proper condition to move on through the stretch of track, it is desirable to extinguish the indicator lamp in the dragging equipment indicator 3DEK, and to "clear" signal 3S; that is, condition signal 3S to provide a green aspect indicating "clear." As has been pointed out hereinbefore, signal 3S and indicator 3DEK are governed by contacts *a* and *e* of relay 3APR, respectively, and the winding of relay 3APR is normally energized by a stick circuit including front contact *b* of relay 3APR. When relay 3APR has released its contacts, a pickup circuit for energizing the winding of relay 3APR may be established by operating a push button PB. Push button PB may be located on the signal mast which supports signal 3S, or thereabouts, so that it can be readily operated by a member of the train crew.

When push button PB is depressed a pickup circuit which may be traced from terminal B, through the contact of the push button PB, and the winding of the slow release push button stick relay PBSR to terminal N is completed thereby energizing the winding of relay PBSR to pick up its contacts. When relay PBSR picks up its contacts a stick circuit which may be traced from terminal B, through back contact *c* of relay 3APR, front contact *b* of relay PBSR, and the winding of relay PBSR to terminal N is established so that the push button PB need only be momentarily depressed in order to energize and then hold relay PBSR energized.

When relay PBSR picks up its contacts the winding of relay 3APR is energized by a pickup circuit which may be traced from terminal B, through contact *b* of relay 3AR in its right-hand position, front contact *a* of relay PBSR, and the winding of relay 3APR to terminal N. It will be remembered that relay 3APR is slow in picking up and releasing its contacts. Thus when relay PBSR picks up its contacts to thereby establish the pickup circuit for energizing the winding of relay 3APR, relay 3APR is slow in picking up its contacts and until relay 3APR picks up its contacts, the winding of relay PBSR remains energized over the foregoing stick circuit including back contact *c* of relay 3APR. However, since relay PBSR is slow in releasing its contacts, when relay 3APR in picking up its contacts opens the stick circuit including back contact *c* of relay 3APR for energizing the winding of relay PBSR, the contacts of relay PBSR remain picked up for a short time interval and the winding of relay 3APR continues to be energized through the circuit including contact *a* of relay PBSR during this short time interval. During this time interval relay 3APR picks up its contacts thereby completing the stick circuit including front contact *b* of relay 3APR for energizing the winding of relay 3APR so that the winding of relay 3APR continues to be energized after relay PBSR releases its contacts.

When relay 3APR picks up its contacts, the circuit including contact *a* of relay 3APR for energizing the winding of relay 3HR is reestablished, and since the code following track relay 3TR is responding to 180 code rate, relay 3HR picks up its contacts and signal 3S displays a green aspect.

Also when relay 3APR picks up its contacts, the circuit for suppplying energy to the winding of relay 4AR is reestablished. Since relay 3HR picks up its contacts at this time as described above, the line winding 16 of relay 4AR is energized by the circuit including contact *d* of relay 3APR, contacts *b* and *c* of relay 3HR, line wire 14, and the rail return loop circuit so that relay 4AR operates its contact to its left-hand position and coded alternating current energy is still not supplied to the rails of track section 4T.

Also, when relay 3APR picks up its contacts, the circuit including back contact *e* of relay 3APR is opened so that energy is no longer supplied to the lamp of the dragging equipment indicator 3DEK.

In view of the foregoing it is now apparent that with the train occupying track section 2T after having actuated the dragging equipment detector located in track section 1T, operation of the push botton PB results in causing the dragging equipment indicator lamp 3DEK to be extinguished, and the signals at the entrance to the various track sections display aspects in the usual manner in accordance with traffic conditions. That is, the signals then display the same aspects, and the circuits associated with the stretch of track then function in the same manner as they would had the train been occupying track section 2T without having actuated the dragging equipment detector.

It should be pointed out that when the dragging equipment detector is located in the rear of a tunnel or bridge at some remote point, it will usually be desirable to locate the push button PB and the dragging equipment indicator 3DEK as described hereinbefore. However, it should also be pointed out that signal 3S may be the home signal of an interlocking plant and that conventional signal levers may also be used to control signal 3S. Accordingly, when the dragging equipment detector is actuated and relay 3APR releases its contacts, signal 3S would display a red aspect even though the towerman might operate the signal levers in an attempt to clear the signal. Under these conditions the dragging equipment indicator 3DEK and the push button PB would preferably be located in the tower, so that when indicator 3DEK was illuminated the towerman would recognize that an approaching train would be stopping rather than proceeding through the interlocking. Furthermore, after an approaching train had stopped and then was ready to proceed, the towerman could depress the push button PB and thereby clear signal 3S.

After the push button PB has been actuated and the train moves past signal 3S, and enters track sections 3T vacating track section 2T, the circuit operation and the aspects displayed by the various signals will be the same as previously described for this condition. Furthermore, the dragging equipment detector can now be actuated by a following train and the signals and indicators will again operate in the same manner as previously described.

Although I have herein shown and described but one form of dragging equipment detector system embodying my invention, it is understood that various changes and modifications may be made therein within the scope of the appended claims without departing from the spirit and scope of my invention.

Having thus described my invention, what I claim is:

1. In a dragging equipment detector system for railroads, in combination, a stretch of railway track, a source of electrical energy, a first relay, a second relay associated with said stretch and having contacts that are picked up or released according as said stretch is occupied or unoccupied, a dragging equipment detector located adjacent said stretch and having a normally closed contact that is opened when said detector is actuated, a series electrical circuit including said normally closed contact, the winding of said first relay, a contact governed by said first relay in its energized position, and said source of electrical energy; a first shunt circuit including a first contact of said second relay connected in multiple with said contact governed by said first relay, a second shunt circuit including a second contact of said second relay connected in multiple with said normally closed contact, said shunt circuits being effective, except when a train occupies said stretch of track, to maintain said first relay energized even though said detector is actuated, a wayside signal located in advance of said dragging equipment detector, a line circuit extending from said dragging equipment detector location to said wayside signal location, an alternating current relay having one winding adapted to be energized by a source of alternating voltage of reference phase and a second winding connected in said line circuit, circuit means including contacts of said second relay for supplying alternating energy of said reference phase or of opposite phase to said line circuit according as the contacts of said second relay are picked up or released, circuit means governed by a contact of said first relay for opening or completing said line circuit according as the contacts of said first relay are in their deenergized or energized position, circuit means actuated by said alternating current relay in response to the presence or absence of energy in said line circuit for causing said wayside signal to display a first or second aspect, and circuit means actuated by said alternating current relay in response to the relative polarity of the energy in the line circuit for indicating the traffic condition in said stretch of said track provided that said contacts of the first relay are picked up.

2. In a dragging equipment detector system for railroads, in combination, a stretch of railway track, a source of electrical energy, a first relay, a second relay associated with said stretch and having contacts that are picked up or released according as said stretch of track is unoccupied or occupied, a dragging equipment detector located adjacent said stretch of track and having a normally closed contact that is opened when said detector is actuated, a series electrical circuit including said normally closed contact, a winding of said first relay, contact means governed by said first relay in its energized position, and said source of electrical energy; a first shunt circuit including a first contact of said second relay connected in multiple with said contact means governed by said first relay, a second shunt circuit including a second contact of said second relay connected in multiple with said normally closed contact, said first and second shunt circuits providing an energizing current path for said first relay at all times while said second relay is energized even though said detector is actuated, a wayside signal located in advance of said dragging equipment detector, a line circuit extending from said dragging equipment detector location to said wayside signal location, a source of alternating voltage, circuit means including contacts of said second relay for supplying energy from said source of alternating voltage to said line circuit and in phase or 180° out of phase with said source according as the contacts of said second relay are picked up or released, circuit means governed by a contact of said first relay for opening or completing said line circuit according as the contacts of said first relay are in their deenergized or energized position, a three position relay having a winding adapted to be connected to said source of alternating voltage and a second winding for operating its contacts to a first position when said second winding is deenergized, to a second position when said second winding is energized by energy in phase with said source of alternating voltage, and to a third position when said second winding is energized by energy 180° out of phase with said source of alternating voltage, the second winding of said three position relay being connected to said line circuit at said wayside signal location, circuit means including a first contact of said three position relay in its first position for supplying energy to said wayside signal, and circuit means including a second contact of said three position relay in its third position for indicating the occupancy of said stretch of track.

3. In a dragging equipment detector system for railroads, in combination with a section of railway track bounded by insulated joints, a source of electrical energy, a first relay having first, second and third contacts, a dragging equipment detector having a normally closed contact that is opened when said detector is actuated, a series electrical circuit including said normally closed contact, a winding of said first relay, said first contact when said first relay is in its energized condition and said source of electrical energy; first circuit means connected in multiple with said first contact, second circuit means connected in multiple with said normally closed contact, both said circuit means being effective when said track section is unoccupied to maintain said first relay in its energized condition regardlesso f actuation of said detector, a line circuit controlled by said second contact, a wayside signal associated with said track section, an alternating current relay at said wayside signal location having one winding adapted to be energized by a source of alternating voltage of reference phase and a second winding connected in said line circuit, traffic responsive means effective while said first relay is energized to supply alternating energy of said reference phase or of opposite phase to said line circuit according as said track is occupied or unoccupied, means controlled by said alternating current relay for supplying train control energy to said track section when said track section is occupied, means controlled by said alternating current relay for causing said signal to display a first or a second aspect according as said line circuit is energized or deenergized, and indication means in the rear of said signal and governed by said third contact.

References Cited in the file of this patent

UNITED STATES PATENTS

| | | |
|---|---|---|
| 2,063,336 | Post | Dec. 8, 1936 |
| 2,385,179 | Allen | Sept. 18, 1945 |
| 2,429,056 | Grosjean | Oct. 14, 1947 |
| 2,581,084 | Dryden | Jan. 1, 1952 |
| 2,581,108 | Jacobus | Jan. 1, 1952 |
| 2,662,971 | Howard | Dec. 15, 1953 |